3,092,139
Patented June 4, 1963

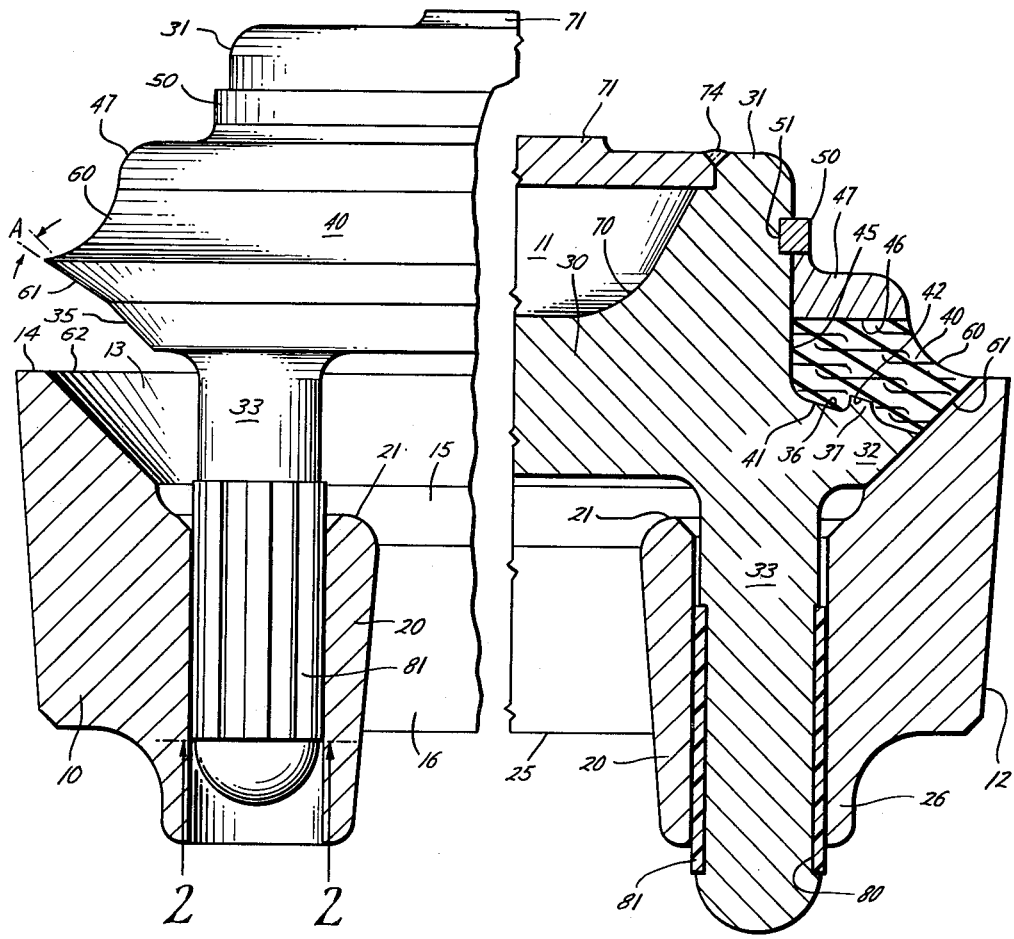
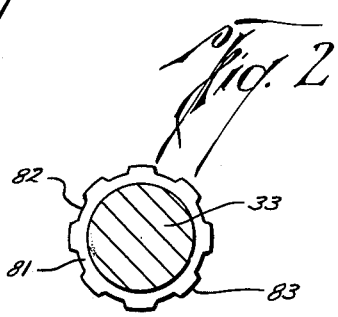
Wallace Fred Olson
Otis Ned Rodgers
Walter Rand Wheeler, Jr.
INVENTORS
BY Murray Robinson
ATTORNEY

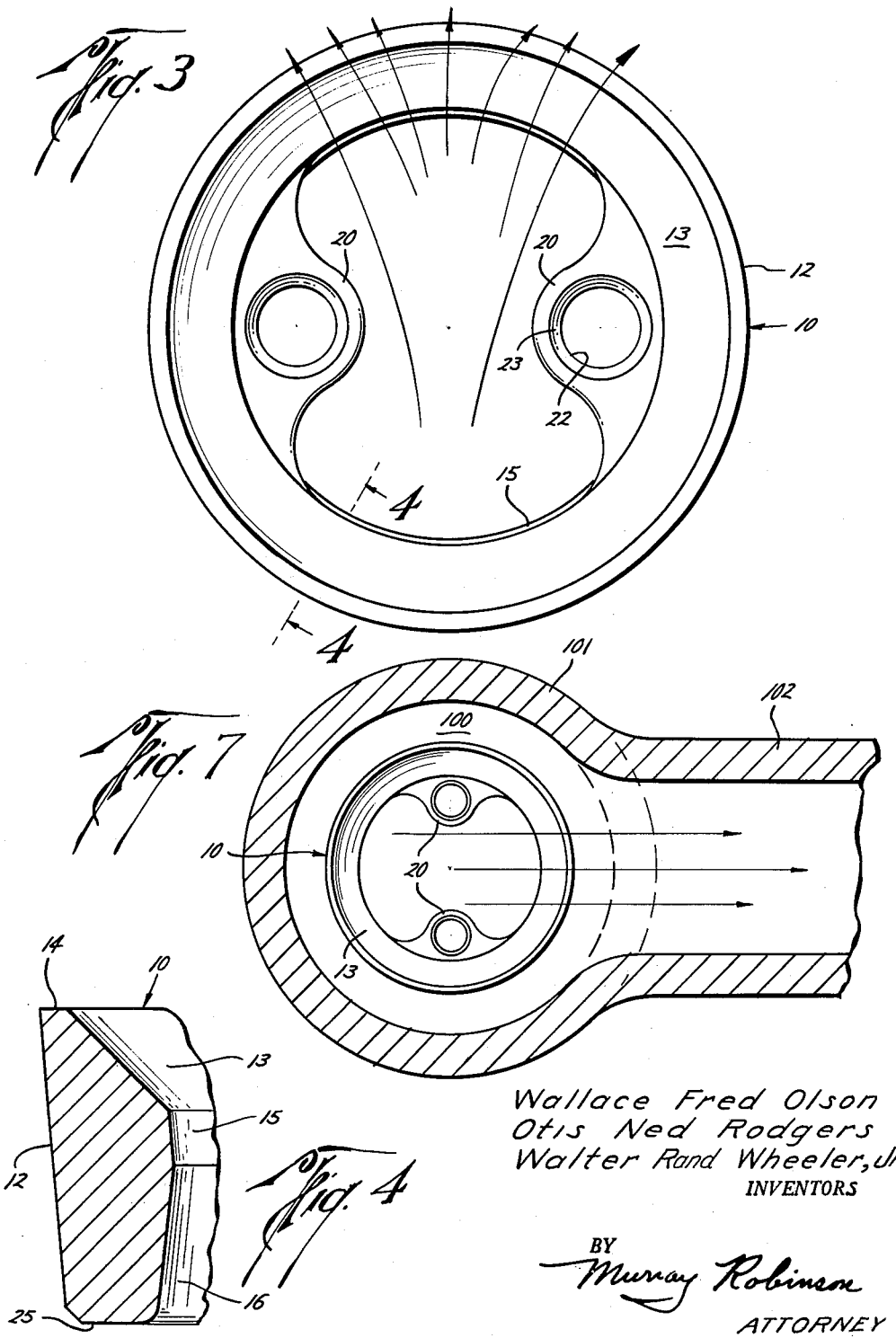

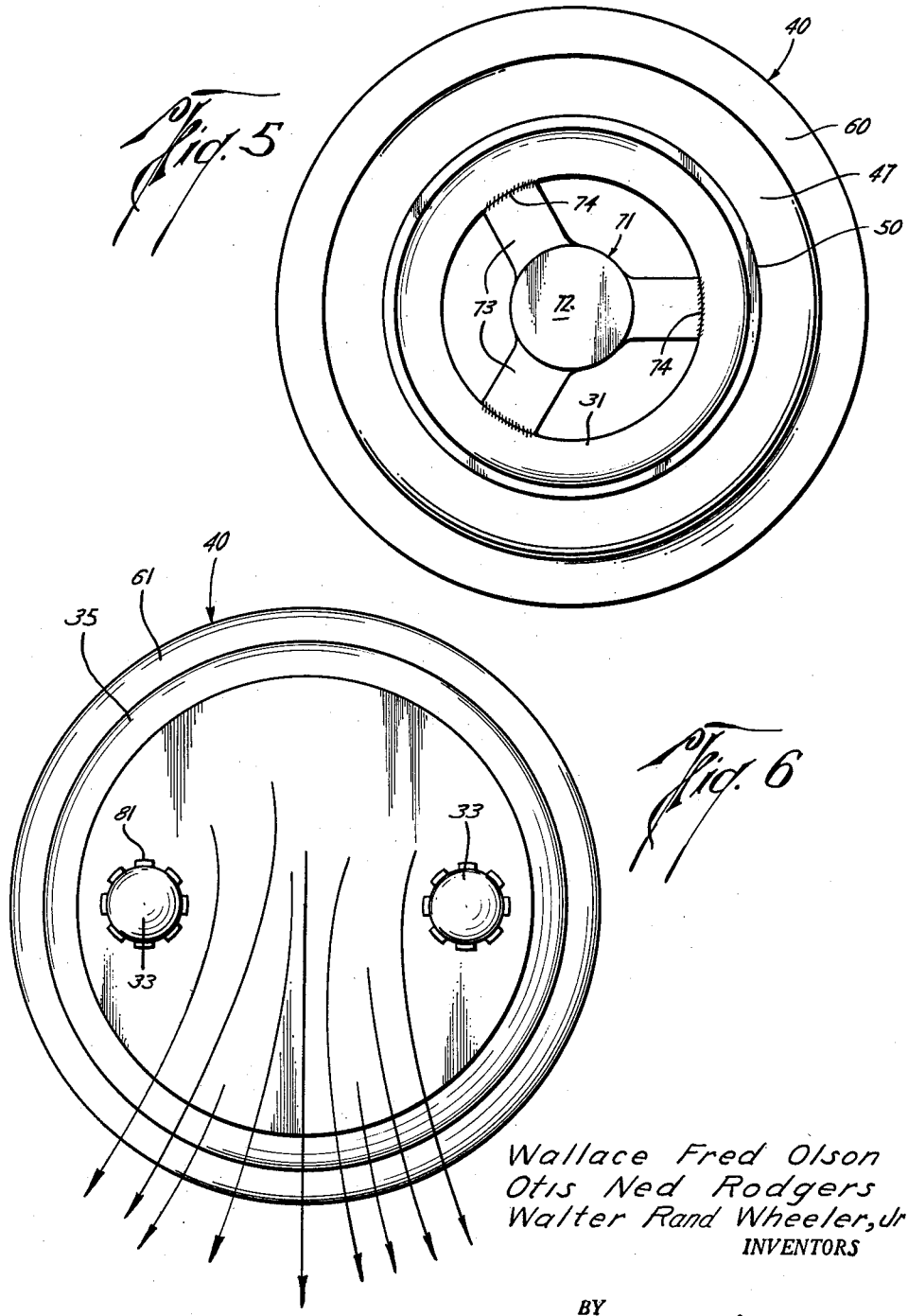

3,092,139
VALVE WITH MEANS FOR CONTROLLING AND INDICATING WEAR
Otis Ned Rodgers, Wallace Fred Olson, and Walter Rand Wheeler, Jr., Oklahoma City, Okla., assignors to American Iron & Machine Works Company, Inc., Oklahoma City, Okla., a corporation of Delaware
Filed Apr. 14, 1960, Ser. No. 22,226
11 Claims. (Cl. 137—533.29)

This invention pertains to valves, and more particularly to check valves used at the inlet and outlet of a pump such as a slush pump used in connection with the rotary type drilling of oil wells.

According to the invention a valve is provided comprising a seat ring which is removably disposed in the valve pot and with which seat ring cooperates a composite valve disc or closure. The seat ring is provided on its interior with two guide bearings disposed at opposite sides of the ring. The valve disc is provided with two guide stems both extending perpendicularly from the disc on the same side thereof. The stems are provided with a covering of wear-resistant, low friction, low adhesion coefficient material, e.g. Teflon. In the normal case in which the disc is urged to closed position by gravity, the stems extend from the bottom of the disc. The guide stems reciprocate in the guide bearings during operation of the valve. The bottom of the valve disc is spaced from the top of the guide bearings even when the valve is closed. The composite valve disc includes a lower metal portion having a conical periphery flaring away from the guide stems and adapted to engage and seat upon a correlative upwardly facing conical seat surface formed on the seat ring. The composite valve disc further includes a sealing material member, e.g. an annular rubber ring, surmounting the lower metal portion and having a peripheral conical surface joining that of the lower metal portion but having a somewhat greater taper angle than that of the lower metal portion so that in closing it contacts the seat ring first. When the seat ring is installed in the valve pot it is placed with the plane defined by the axis of the two guide bearings perpendicular to the direction of fluid flow out of the valve.

The valve combines a number of advantages among which may be mentioned:

(a) Larger flow passage through seat ring of a given diameter, by elimination of the radial supports required for usual center guide bearing or the radial webs of a wing guided valve, whereby flow is less restricted going through valve.

(b) Single flow passage through seat ring whereby flow is not divided.

(c) Orientation of valve closure relative to valve seat whereby proper mating and hence sealing is still maintained after valve becomes worn.

(d) Lowered valve height by elimination of upper guide stem and guide bearing whereby valve pots can be smaller, and when valve is used as an intake valve the upswept volume of pump chamber is reduced.

(e) Incorporation of guide bearings in seat ring whereby they can be readily replaced.

(f) Valve stem friction and abrasion reduced whereby stems last longer and move freely at all times.

In achieving a combination of the foregoing advantages it is a characteristic of the invention that the guide stems and guide bearings are disposed within the periphery of the valve seat area and adjacent thereto.

For a detailed description of a preferred embodiment of the invention reference will now be made to the accompanying drawings wherein:

FIGURES 1A and 1B together form a side elevation, partly in section, of a valve embodying the invention, FIGURE 1A showing the left half of the valve in open position and FIGURE 1B showing the right half of the valve is closed position;

FIGURE 2 is a sectional view of a valve stem viewed as indicated at 2—2 of FIGURE 1A;

FIGURE 3 is a top view of the valve seat ring;

FIGURE 4 is a section taken at line 4—4 on FIGURE 3;

FIGURE 5 is a top view of the valve closure;

FIGURE 6 is a bottom view of the valve closure; and

FIGURE 7 is a horizontal section through a valve pot and flow outlet.

Referring now to FIGURES 1A and 1B, there is shown a valve comprising a seat ring 10 and a disc or closure 11.

Referring now also to FIGURES 3 and 4, the seat ring 10 is a steel casting having an outer periphery 12 that is slightly tapered to facilitate a tight fit in a pump inlet or outlet passage. The seat ring has a finished conical interior surface area forming a seat 13. The upper face 14 of the ring is a finished surface perpendicular to the ring axis. The flow passage through the ring below the seat 13 is formed by upwardly and downwardly flaring portions 15, 16, as needed to provide draft for the casting.

Inside the seat 13 and adjacent thereto are two guide bearings 20 disposed diametrically opposite each other. The upper end 21 of each bearing is disposed spaced below the lower edge of seat 13. Each bearing comprises a boss cast integral with the rest of the seat ring and bored to form a passage 22 to receive a guide stem. The upper end of the passage 22 is provided with an entrance bevel 23. To provide additional support to prevent inclination of the closure 11 relative to the seat ring 10 the guide bearings are elongated and extend below the bottom face 25 of the seat ring forming tubular protrusions 26 therebeneath.

Referring now to FIGURES 1A, 1B, 2, 5 and 6, the closure 11 comprises a steel body casting 30 having a central hub 31, a radial flange 32, and a pair of guide stems 33 extending therebelow. The flange 32 has an upwardly flaring conical seating surface 35 correlative to the seat 13 of the seat ring 10. The upper face 36 of flange 32 is conical flaring downwardly and has an upstanding retention bead 37 formed thereon.

Surmounting the flange 32 and annularly disposed around hub 31 is seal ring 40 which is made of a suitable sealing material such as a natural or synthetic rubber compound, preferably having a durometer hardness in the range of 65 to 100. Seal ring 40 has a lower face 41 that is conical flaring downwardly correlative to upper face 36 of the flange 32. There is an annular retention recess 42 in the lower face of the seat ring which cooperates with retention rib 37 to retain the seat ring on the flange 32 and prevent radial expansion of the seat ring.

The inner surface 45 of the seal ring is cylindrical to conform to the cylindrical outer surface of the hub 31. The upper face 46 of the seal ring is plane to cooperate with the plane lower surface of an annular metal compression ring 47 disposed thereon. The compression ring is held in place on the hub 31, with the seal ring in slight compression therebelow, by means of a split snap ring 50 disposed in annular groove 51 around the hub.

The outer periphery of the seal ring 40 is made up of an upper downwardly flaring surface 60 having a concave cross section and a lower upwardly flaring conical surface 61. The two surfaces 60, 61 form between them a lip of angular cross section about the periphery of the seat ring. This lip does not extend radially beyond seat 13 to overlie upper face 14 of the seat ring so there is no tendency for the lip to be torn off by the edge 62 formed at the juncture of the seat and the tip of the seat ring. However the lower face 61 of the lip has a greater taper angle or cone apex angle than the seat 13 as appears from the discontinuity where the seal ring face 61 joins seating surface 35 of the body of the closure, the seating surface 35 having the same taper angle as the seat 13. This difference in taper angle is indicated by the angle A on FIGURE 1A of the drawings and is preferably in the range of 5 to 15 degrees, e.g. 10 degrees. This difference in taper angle causes the flexible periphery of the lip of the seal ring to engage the seat 13 prior to the remainder of the closure, thereby cushioning the closure of the valve. As the valve closes, the lip flexes and finally its under surface 61 conforms to the seat 13, as shown in FIGURE 1B, at which time the seating surface 33 of the body of the closure also comes into engagement with the seat 13. Since the valve is effectively sealed as soon as the lip of the seal ring engages the seat, which is prior to seating of the body of the closure, there is a reduction of the abrasion of the closure body and the seat such as occurs when there is a high velocity of flow between these surfaces at the time of closure.

Even when fully closed, the bottom of the closure body is spaced above the upper ends 21 of the guide bearings. Therefore there is no pounding on these cantilever mounted members which might tend to break them off and there is no interference with proper seating of the valve as it wears. By proper choice of the spacing of the tops of the bearings below the seat, contact will be made when the valve is excessively worn thereby indicating replacement is in order upon visual inspection of the tops of the guide bearings.

The top of the hub 31 is hollowed out as shown at 70, in order to lighten the closure. A handle 71 comprising a center disc 72 and a plurality of radial supporting arms 73 is secured thereto as by welding at 74.

Each of the stems 33 is rounded at its lower end and is pivoted thereabove with a reduced diameter portion or neck 80. Into the neck is snapped a resilient sleeve 81 which is of larger outer diameter than the main body of the stem. The sleeve is made of low friction coefficient, low adhesion coefficient, wear resistant material such as polymerized tetrafluoroethylene, known commercially under the trade name "Teflon." As shown best in FIGURE 2, the sleeve is grooved or fluted at 82 leaving vertical ribs 83 spaced apart circumferentially around the outer periphery of the sleeve. The additional lubrication provided by grooves 82, coupled with the reduced contact area of the ribs 83, the resilience or low elastic modulus of the sleeves, the spacing of the hard, metal bodies of the guide stems from the guide bearings by the sleeves, all combine with the special properties of the Teflon sleeve material to greatly reduce the possibility of the guide stems sticking in their guide bearings. This is especially important in the present case where no upper guide stem is used and cocking of the valve due to stem and guide bearing wear is accentuated.

In instances where stem sticking is not a problem, e.g. where an upper guide stem is incorporated in the construction, or where maintenance is reasonable or the service light whereby operation with worn stems and bearings is not to be expected, or in cases where the pump size is such that the bearing extension 26 may be of extra length, or the fluids being handled are of a more lubricative nature, or experience otherwise indicates that stem sticking is not likely, more conventional forms of stem sleeves may be used, e.g. simple rubber rings. For longer life a synthetic polymeric amide, i.e. nylon may be used.

From the foregoing detailed description of the invention it is believed that it is apparent how the valve will operate and how the aforementioned advantages thereof are achieved. It may be helpful to point out, however, referring to FIGURES 3, 6 and 7, that when the seat ring 10 of the valve is properly placed in the deck 100 of the valve pot 101 with the plane of the axes of its guide bearing 20 perpendicular to the expected direction of flow through outlet passage 102, the fluid will all be between the stems as shown by the arrows, whereby the flow will not be divided and there will be less loss of energy and pressure drop in flowing through the valve; furthermore the reduction in turbulence will result in less valve wear. While more than two guide stems and bearings could be used to achieve additional valve guidance and prevention of valve closure rotation, this would tend to constrict and divide the flow; therefore two is the preferred number of guide means. It is also to be observed that many of the advantages of the invention can be obtained by using a single eccentric lower guide stem and guide bearing, thus even increasing the cross sectional area of the flow passage. However such a construction would leave the valve closure free to rotate out of registration with its seat if it opened too far. Therefore a two-stem valve is best.

While a preferred embodiment of the invention has been shown and described, many modifications thereof can be made by one skilled in the art without departing from the spirit of the invention and it is desired to protect by Letters Patent all forms of the invention falling within the scope of the following claims.

What we claim is:

1. A valve comprising a seat ring and closure, said seat ring having an annular seat and having an eccentric guide bearing within and adjacent to the inner periphery of said annular seat, and said closure having an annular seating surface engaging said annular seat when the valve is closed, and having an eccentric guide stem cooperating with said bearing, said stem being spaced inwardly from the inner periphery of the seating surface of the closure a distance substantially equal to the distance of the bearing from the annular seat, whereby the flow of fluid through the valve is not divided by the stem or the bearing.

2. The combination of claim 1 in which there are a plurality of said eccentric guide bearings and a plurality of said eccentric guide stems each cooperating with one of said guide bearings.

3. The combination of claim 2 in which there are two bearings disposed at diametrically opposite positions inside the seat ring and an equal number of guide stems.

4. The combination of claim 1 and including resilient sleeve means disposed between said stem and bearing, said sleeve means being made of a material having a low coefficient of friction, low adhesion to metal coefficient, and a high resistance to wear and abrasion.

5. The combination of claim 1 and including resilient sleeve means disposed between said stem and said bearing, said sleeve means comprising a Teflon sleeve.

6. The combination of claim 1 in which said stem is formed with a neck and including resilient sleeve means disposed between said stem and said bearing, said sleeve means comprising a sleeve disposed thereon whose outer diameter is larger than that of said stem, said sleeve being exteriorly vertically fluted.

7. The combination of claim 1 and including resilient sleeve means disposed between said stem and said bearing, said sleeve means comprising a nylon sleeve.

8. A valve comprising a seat ring and closure, said seat ring having a plurality of eccentric guide bearings and said closure having a plurality of eccentric guide stems, each stem cooperating with one of said bearings, said closure having a conical seating surface and said seat ring having a conical seat and said bearings being disposed spaced below said seat, said closure further including a resilient seal ring having a tapering periphery of greater taper angle than said seating surface and said periphery being deformable to conform in taper to said seating surface and seat when the valve is closed, said valve being characterized by the fact that when the valve is closed the closure is spaced above said bearings a distance equal to the permissible wear of the valve.

9. The combination of a valve comprising a seat ring having at least two eccentric guide bearings and a closure having at least two eccentric guide stems each cooperating with one of said guide bearings, a valve pot having an inlet and an outlet and therebetween a deck in which the seat ring is disposed, said seat ring being oriented with the plane defined by the axes of the two guide bearings lying perpendicular to the axis of said outlet.

10. A valve comprising a seat ring and a closure, said seat ring having a guide bearing and said closure having a guide stem cooperating with said bearing, said seat ring having a seat and said closure having a seating surface, the portion of said closure around said guide stem being spaced from said guide bearing when said seating surface is engaged with said seat by a distance equal to the permissible wear of said valve, whereby throughout the life of the valve said portion of said closure is out of contact with said guide bearing, the contacting of said portion and bearing indicating it is time for replacement.

11. A valve comprising a seat ring having an annular outwardly flaring conical seat, said seat ring being radially imperforate, a closure having an annular outwardly flaring conical seating surface engaging said seat when the valve is closed, said closure having a pair of stems extending therefrom inside said seat, said seat ring having a pair of bearings within which said stems are slidably engaged, said bearings being disposed adjacent the inner periphery of said seat, the inner periphery of said seat ring having a diameter substantially coinciding with the diameter of the inner periphery of said conical seat except where interrupted by said bearings.

References Cited in the file of this patent

UNITED STATES PATENTS

| | | |
|---|---|---|
| 2,233,649 | Stahl | Mar. 4, 1941 |
| 2,300,815 | Sharp | Nov. 3, 1942 |
| 2,329,576 | Anderson | Sept. 14, 1943 |
| 2,368,887 | Schuler | Feb. 6, 1945 |
| 2,413,869 | Hamer | Jan. 7, 1947 |
| 2,452,881 | Vezie | Nov. 2, 1948 |
| 2,613,054 | Maier | Oct. 7, 1952 |
| 2,903,235 | Rodgers | Sept. 8, 1959 |